United States Patent
Becker et al.

(10) Patent No.: US 8,737,685 B2
(45) Date of Patent: May 27, 2014

(54) SYSTEMS AND METHODS FOR DETECTING THE MOVEMENT OF AN OBJECT

(75) Inventors: Karl Becker, Riverview, FL (US); Nicholas Lyn-Sue, Seminole, FL (US); Manuel I. Rodriguez, St. Petersburg, FL (US); John White, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 328 days.

(21) Appl. No.: 13/093,548

(22) Filed: Apr. 25, 2011

(65) Prior Publication Data

US 2012/0269387 A1 Oct. 25, 2012

(51) Int. Cl.
*G06K 9/00* (2006.01)

(52) U.S. Cl.
USPC ........................................................ 382/103

(58) Field of Classification Search
None
See application file for complete search history.

(56) References Cited

U.S. PATENT DOCUMENTS

| | | | |
|---|---|---|---|
| 4,238,828 A | 12/1980 | Hay et al. | |
| 4,281,342 A | 7/1981 | Ueda et al. | |
| 4,297,725 A | 10/1981 | Shimizu et al. | |
| 4,805,127 A * | 2/1989 | Hata et al. | 345/441 |
| 4,887,223 A | 12/1989 | Christian | |
| 5,521,843 A | 5/1996 | Hashima et al. | |
| 5,596,365 A | 1/1997 | Erickson et al. | |
| 5,767,922 A * | 6/1998 | Zabih et al. | 348/700 |
| 6,321,137 B1 | 11/2001 | De Smet | |
| 6,380,986 B1 | 4/2002 | Minami et al. | |
| 6,616,244 B2 | 9/2003 | Hakkinen | |
| 6,954,544 B2 * | 10/2005 | Jepson et al. | 382/107 |
| 7,184,586 B2 | 2/2007 | Jeon et al. | |
| 7,231,063 B2 | 6/2007 | Naimark et al. | |
| 7,430,455 B2 | 9/2008 | Casey et al. | |
| 7,437,226 B2 | 10/2008 | Roh et al. | |
| 7,702,420 B2 | 4/2010 | Goto et al. | |
| 7,765,027 B2 | 7/2010 | Hong et al. | |
| 2002/0076105 A1 * | 6/2002 | Lee | 382/190 |
| 2002/0091466 A1 | 7/2002 | Song et al. | |
| 2008/0082468 A1 * | 4/2008 | Long et al. | 706/12 |
| 2008/0284790 A1 | 11/2008 | Protola et al. | |
| 2008/0288207 A1 * | 11/2008 | White | 702/152 |

(Continued)

OTHER PUBLICATIONS

Guna Seetharaman and Ha V. Le, "Video-Assisted Global Positioning in Terrain Navigation with Known Landmarks" International Journal of Distributed Sensor Networks, vol. 2 (2006), Issue 2, pp. 103-119 doi:10.1080/15501320500201235.*

(Continued)

*Primary Examiner* — Tahmina Ansari
(74) *Attorney, Agent, or Firm* — Ingrassia Fisher & Lorenz, P.C.

(57) ABSTRACT

Systems and methods are provided for detecting a movement of an object marked with a marker. The system includes a sensor configured to capture a first image of the marker and to capture a second image of the marker after the first image, each of the first and second images having pixels each having a visual intensity. A controller is configured to compare the first image and the second image by comparing the visual intensity of each of the pixels of the first image and the second image, determine an area of overlap between the first image and the second image based on the comparison, calculate a change in position of the marker in the second image relative to the marker in the first image based on the area of overlap, and detect the movement of the object based on the change in position of the marker.

17 Claims, 4 Drawing Sheets

(56) References Cited

U.S. PATENT DOCUMENTS

| | | | |
|---|---|---|---|
| 2009/0059041 A1* | 3/2009 | Kwon | 348/241 |
| 2010/0100321 A1 | 4/2010 | Koenig et al. | |
| 2010/0103323 A1* | 4/2010 | Wredenhagen | 348/699 |
| 2011/0004405 A1* | 1/2011 | Hutchin | 701/222 |
| 2011/0178658 A1* | 7/2011 | Kotaba et al. | 701/3 |
| 2011/0280454 A1* | 11/2011 | Su et al. | 382/117 |
| 2012/0169871 A1* | 7/2012 | Sablak et al. | 348/143 |
| 2012/0170865 A1* | 7/2012 | Song et al. | 382/275 |

OTHER PUBLICATIONS

Weisstein, Eric W. "Circle-Circle Intersection." From MathWorld—A Wolfram Web Resource. http://mathworld.wolfram.com/Circle-CircleIntersection.html, Date Accessed Oct. 26, 2013, Internet Archive Capture from Apr. 2, 2007, Available Online at: https://web.archive.org/web/20070402085130/http://mathworld.wolfram.com/Circle-CircleIntersection.htm.*

* cited by examiner

SYSTEMS AND METHODS FOR DETECTING THE MOVEMENT OF AN OBJECT

STATEMENT REGARDING FEDERALLY SPONSORED RESEARCH OR DEVELOPMENT

This invention was made with Government support under Contract FA9453-08-C-0162 awarded by the Air Force Research Laboratory. The Government has certain rights in the invention.

TECHNICAL FIELD

The present invention generally relates to systems and methods for detecting the movement of an object, and more particularly relates to systems and methods for detecting the movement of an object in a navigation system.

BACKGROUND

An inertial navigation system (INS) is a navigation aid that uses motion and rotation sensors, such as accelerometers and gyroscopes, to continuously calculate the position, orientation, and velocity of a vehicle without the need for external references. INSs may be used on vehicles such as ships, aircraft, submarines, guided missiles, and spacecraft.

As examples, the accelerometers and gyroscopes used in navigation systems may have freely rotating masses that are monitored to determine the kinematic state changes of the vehicle. Given the sensitivity of the accelerometers and gyroscopes, it is generally undesirable for the monitoring sensors to have physical contact with the rotating masses. However, non-contact sensors or other devices that monitor the movement of the subject objects may not have sufficient accuracy or speed and may be subject to high costs and large processing requirements.

Accordingly, it is desirable to provide improved systems and methods for monitoring the position and movement of an object, particularly in a navigation system. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a system is provided for detecting a movement of an object marked with a marker. The system includes a sensor configured to capture a first image of the marker and to capture a second image of the marker after the first image, each of the first and second images including pixels each having a visual intensity; and a controller coupled to the sensor. The controller is configured to compare the first image and the second image by comparing the visual intensity of each of the pixels of the first image with the visual intensity of each of the pixels of the second image, determine an area of overlap between the first image and the second image based on the comparison, calculate a change in position of the marker in the second image relative to the marker in the first image based on the area of overlap, and detect the movement of the object based on the change in position of the marker.

In accordance with an exemplary embodiment, a method is provided for detecting a movement of an object marked with a marker. The method includes capturing a first image of the marker; capturing a second image of the marker, the first and second images comprising pixels, each with a respective visual intensity; comparing the first image and the second image by comparing the visual intensity of each of the pixels of the first image with the visual intensity of each of the pixels of the second image; determining an area of overlap between the first image and the second image based on the comparison; calculating a change in position of the marker in the second image relative to the marker in the first image based on the area of overlap; and detecting the movement of the object based on the change in position of the marker.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein provide system and methods for detecting the movement and tracking the position of an object. Particularly, the object is marked or overlaid with a reference marker, for example, a circular reference marker. A sensor captures a grayscale image of the marker, and a controller identifies the marker and its position. The sensor subsequently captures a second grayscale image to determine the change of position of the marker during the time period between the first and second images. For example, the comparison identifies the intersection points, particularly by identifying the intersecting arcs. The change in position is calculated from the length of the chord formed by the intersecting arcs. Finally, the movement and resulting position of the object is calculated from the change in position of the marker. Such systems and methods may be incorporated into inertial navigation systems or into any type of system that involves monitoring the position of any marked object.

Figure 1:
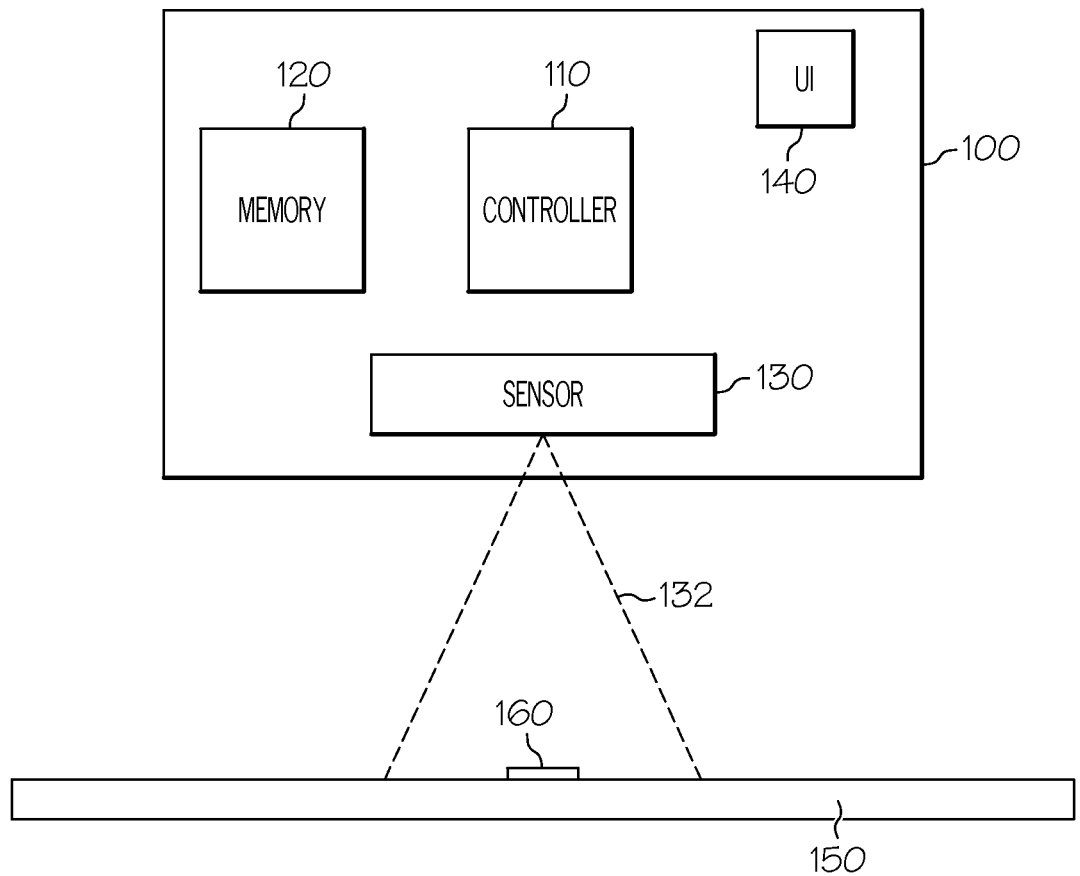
FIG. 1 is a block diagram of a system for detecting the movement of an object in accordance with an exemplary embodiment.

FIG. 1 is a block diagram of a system 100 for detecting the change in position of a movable object 150 in accordance with an exemplary embodiment. The system 100 includes a controller 110, memory 120, a sensor 130, and a user interface 140. As described below, the system 100 is configured to detect the movement of the object 150 by tracking the position of a known reference marker 160 etched, drawn, affixed or otherwise mounted or overlaid on the object 150. In the discussion below, the term "marked" or "marker" may refer to any of these techniques. In one exemplary embodiment, the marker 160 is circular in the xy-plane, although other shapes may be provided. Additionally, although only marker 160 is shown, the object 150 may be provided with more than one marker 160 that collectively form a pattern.

Typically, the object 150 and system 100 are used in a controlled environment, and the object 150 may generally move only relatively small distances, e.g., relative to dimension of marker 160 between sequential frames captured by the sensor 130, as discussed below. However, the system 100 may also monitor any type of object 150, including those in an unpredictable environment.

In one exemplary embodiment, the system 100 and object 150 may be part of the larger inertial navigation system (INS) that uses motion sensors (e.g., accelerometers) and rotation sensors (e.g., gyroscopes) to continuously calculate the position, orientation, velocity, and acceleration of a vehicle, such as ships, aircraft, submarines, guided missiles, and spacecraft. In other embodiments, the system 100 may be part of any position detection device for detecting the change in position of any object 150 marked with the reference marker 160. Examples of suitable applications may include a near-to-eye head mounted display that tracks the position of the head of the user and thus the line of sight, a manufacturing assembly line that tracks products, a navigation system that tracks the position of an approaching marked object, or a testing system that monitors the oscillation of a slip table.

The controller 110 generally includes one or more processing units configured to implement the functions described herein. Particularly, and as discussed below, the controller 110 is configured to determine the movements and resulting positions of the marker 160 and the object 150 based on the image data from the sensor 130. Additionally, if the system 100 is part of navigation processing, the controller 110 may further include a kinematic state estimation module (not shown) for estimating the kinematic state (e.g., position, velocity, and acceleration) of a vehicle based on the changes in position of the object 150. In one exemplary embodiment, the system 100 may be applied to sense the relative motion of subassemblies (e.g., as an object 150) internal to the navigation systems to provide relative attitude information to the state estimation. In another exemplary embodiment, the system 100 may be applied to sensing the external environment (e.g., in which objects 150 in the environment are marked) to provide rate estimates to aid the state estimation.

The controller 110 also has access to data, such as program instructions or computational data, from memory 120. As examples, the memory 120 may store known characteristics of the object 150, such as shape and dimensions; known characteristics of the marker 160, such as shape and dimensions; and known characteristics about the relationship between the marker 160 and the object 150, such as the position of the marker 160 on the object 150. The memory 120 may include any suitable type of memory or data storage, such as for example, RAM, ROM, EEPROM, flash memory, CD, DVD, or other optical storage, magnetic storage devices, or any other medium that can be used to store and access desired information by the controller 110 and other portions of the system 100.

The sensor 130 is an optical sensor configured to capture images of the marker 160 within a field of view (FOV) 132. For example, the sensor 130 may be a charge-coupled device (CCD), indium gallium arsenide (InGaAs), PIN (p-type/intrinsic/n-type structure) diode array or other type of camera or image capturing device sensing in a spectrum able to detect marker 160, including in an optical spectrum not visible to the human eye. As discussed below, the sensor 130 may have a resolution suitable for capturing grayscale images of the marker 160. The sensor 130 may capture the images at a sample rate selected or otherwise controlled by the controller 110 for subsequent evaluation of the position of the marker 160. For example and as discussed in greater detail below, the sensor 130 may capture a first image at a first time ($t_0$), a second image at a second time ($t_1$), and additional images at subsequent times ($t_{n+1}$), each of which are sequentially separated by a known period of time (dt). The sample rate may be based on, for example, the anticipated movement of the object 150, the dynamics of the associated vehicle, or the processing resources allocated to the system 100. In one exemplary embodiment, the sample rate is selected such that the predicted change in position of the marker 160 does not exceed a distance of greater than a radius of the marker 160 during the elapsed time period (dt) between sequential images. Other design parameters that may be selected under these considerations include the dimensions of the marker 160 and the selected time period Although not shown, the sensor 130 may be pivotable such that the FOV 132 may be adjusted. Moreover, the sensor 130 may have a "zoom" feature that enables the system 100 to adjust the size of the FOV 132. In one exemplary embodiment, the controller 110 may adjust the FOV 132 of the sensor 130 based on predictions of the change in position of the marker 160 such that the marker 160 does not move outside of the FOV 132 during one or more sequential images.

The sensor 130 or the system 100 may include further optical components for capturing and processing the visual images. For example, the system 100 may include illumination sources, mirrors, light pipes, fiber optics, and magnifying devices.

The system 100 further includes the user interface 140. The user interface 140 is any component, including hardware and software, that enables the user to interact with the system 100, particularly the controller 110. Such components may include keyboards, mouse devices, buttons, switches, levers, and knobs. In one exemplary embodiment, the user interface 140 may include a display, such as a touch screen display, for displaying the images captured by the sensor 130 and other visual data representing the position or movement of the object 150.

Figure 2:
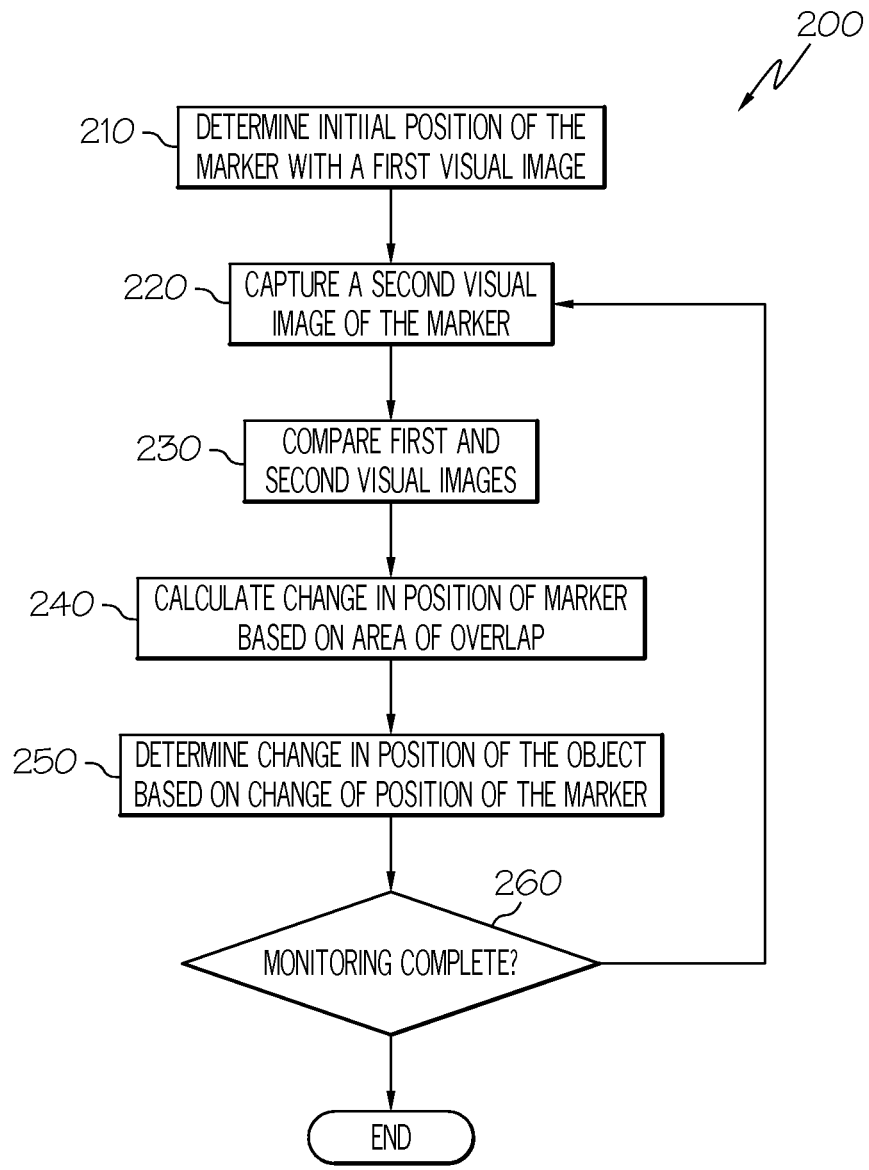
FIG. 2 is a flowchart depicting a method for detecting the movement of an object in accordance with an exemplary embodiment.

FIG. 2 is a flowchart depicting a method 200 for detecting the position of an object in accordance with an exemplary embodiment. Particularly, the method 200 may be implemented with the system 100 of FIG. 1 to determine the changes in the position of the marker 160, and thus, the changes in the position and the resulting positions of the object 150 over time. As such, FIG. 2 will be described with reference to FIG. 1 as well as FIGS. 3-6, which illustrate the various steps of the method 200.

In step 210 of the method 200, the system 100 determines the initial position of the marker 160 on the object 150, e.g., the position of the marker 160 at a first instance of time ($t_0$). The initial position of the marker 160 may be determined in any suitable manner, including a known initial calibration of the object 150 and system 100. In one exemplary embodiment, the system 100 determines the initial position of the marker 160 by capturing a first visual image of the object and calculating the initial position based on the visual image.

Figure 3:
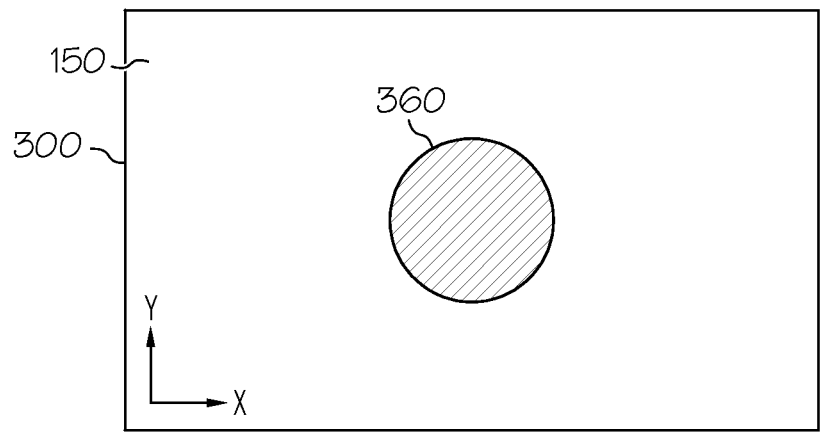
FIG. 3 is a first visual image of a marker captured by the system of FIG. 1 in accordance with an exemplary embodiment.

As one exemplary embodiment, FIG. 3 is a first visual image 300 captured by the sensor 130 and depicts a marker 360 on the object 150. In FIG. 3, the visual representation of the marker 160 from FIG. 1 is labeled as marker 360 to represent the initial position of the marker 160 (e.g., at time=$t_0$) and to provide clarity in the subsequent discussions of the visual representations of the marker 160 at other time periods (e.g., at time=$t_1$).

The sensor 130 may provide the visual image 300 to the controller 110. In response, the controller 110 may process the visual image 300 to identify the marker 360, for example, using pattern recognition, and to determine the position of the marker 360. For example, the controller 110 may determine the center and boundaries of the marker 360. The controller 110 may contain known characteristics of the marker 360 and the object 150 stored in memory to aid in this determination and/or use standard image processing algorithms for calculation, such a centroid determination or edge detection.

Particularly, the controller 110 may generate or evaluate the visual image 300 as a grayscale image. In other words, each of the pixels of the visual image 300 may have an associated visual intensity expressed as a quantifiable grayscale value. For example, each pixel of the visual image 300 may have a grayscale value that ranges from 0 to 255 (e.g., in an 8-bit code unit). Pure white may be quantified as a grayscale value of 0, and pure black may be quantified as a grayscale value of 255. In one exemplary embodiment, the marker 360 is black and the object 150 is otherwise white such that the pixels having a value of 255 represent the image area associated with the marker 360 and the pixels having a value of 0 represent the image area associated with portions of the object 150 not covered by the marker 360. In a further embodiment, the controller 110 may implement threshold measurement and contrast algorithms to translate the non-ideal image in to a nearly ideal image in which only the pure dark and pure white values are represented. As such, this embodiment reduces the bit resolution to a grayscale value of 1 bit per pixel with 1 representing dark areas and 0 representing white or vice versa. The grayscale values may be stored in memory 120 for subsequent processing. Other mechanisms for quantifying the visual intensity of the marker 360 in the visual image 300 may be provided.

Figure 4:
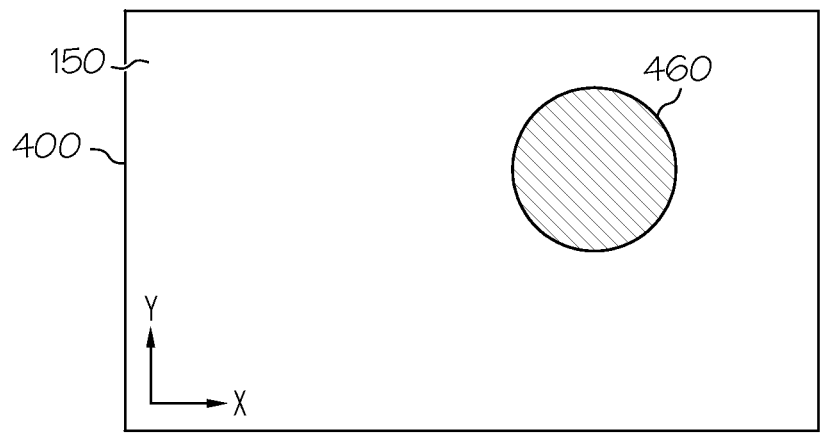
FIG. 4 is a second visual image of the marker captured later in time by the system of FIG. 1 in accordance with an exemplary embodiment.

In step 220 of the method 200, the system 100 captures a subsequent (or second) visual image of the marker 160 on the object 150. FIG. 4 is a second visual image 400 of the marker 460 on the object 150. In FIG. 4, the marker 460 in the second visual image 400 is labeled as marker 460 to represent the visual image 400 of the marker 460 captured after the visual image 300 of FIG. 3 (e.g., at time=$t_1$).

The sensor 130 may provide the visual image 400 to the controller 110. In response, the controller 110 may process the visual image 400 to quantify the visual image 400 in grayscale, particularly to represent the marker 460 grayscale, as described above. In one exemplary embodiment, the controller 110 does not use pattern recognition or other processing techniques to determine the identity and position of the marker 460 based only on the visual image 400. Instead, only the grayscale values must be stored for further processing, in effect, as a "reduced image."

In step 230 of the method 200, the system 100 evaluates or otherwise compares the grayscale values of the first visual image 300 and the grayscale values of the subsequent, second visual image 400. Particularly, the controller 110 may use a simple logical AND operation to compare the grayscale representations. For example, in the 1 bit per pixel image reduction discussed above, the result of the logical AND operation will be a 1 where both images 300 and 400 were dark and a 0 in all other cases. Alternatively, in the embodiment in which the 256-scale grayscale values are determined, the controller 110 may sum grayscale values of respective pixels in the visual images 300 and 400. The resulting values of the summed pixels may be referred to as composite pixel values.

Figure 5:
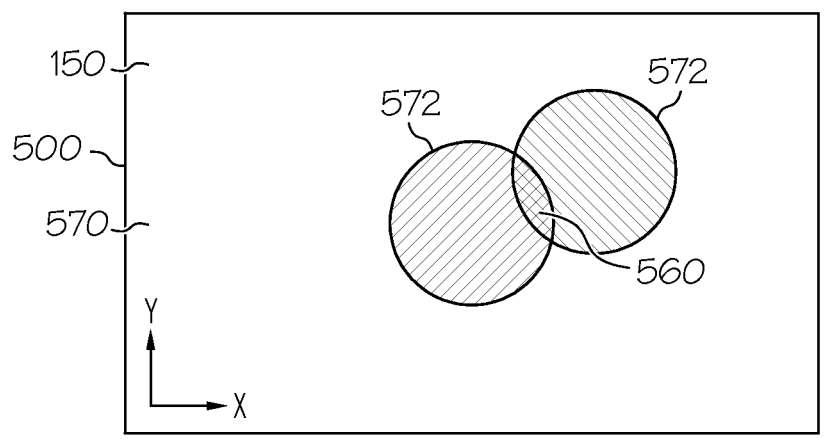
FIG. 5 is a representation of an evaluation of the visual images of FIGS. 3 and 4.

FIG. 5 is a visual image 500 representing the comparison between the visual images 300 and 400 of FIGS. 3 and 4.

Using the 256-bit grayscale example discussed above, the sum of the visual images 300 and 400 represented by visual image 500 includes portions 570 in which the marker 360 or 460 did not appear in either visual image 300 or 400 (e.g., composite pixel values near 0); portions 572 in which the marker 360 or 460 appeared in one of the visual images 300 or 400 (e.g., composite pixel values of about 255); and portions 560 in which the markers 360 and 460 overlap (e.g., large composite pixel values of about 510). As shown in FIG. 5, the overlap portion 560 is represented by two intersecting arcs associated with the marker 360 (FIG. 3) and marker 460 (FIG. 4).

Figure 6:
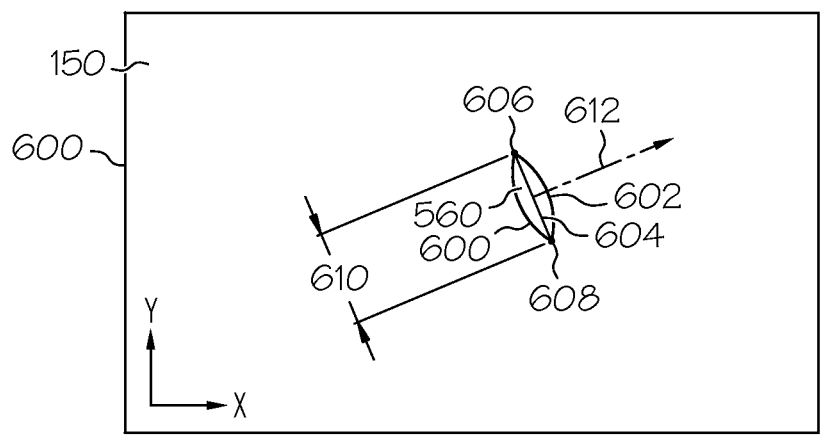
FIG. 6 is a further representation of the evaluation of the visual images of FIGS. 3 and 4.

In step 240 of the method 200, the system 100 evaluates the overlap portion 560 to determine the change in position of the marker 160 during the time period, e.g., the position of marker 460 in visual image 400 (FIG. 4) relative to marker 360 in visual image 300 (FIG. 3). FIG. 6 is a further representation 600 to illustrate the calculation of the relative movement between visual images 300 and 400 of FIGS. 3 and 4 based on the overlap portion 560.

In one exemplary embodiment, the controller 110 identifies the intersecting arcs 600 and 602 that define the overlap portion 560. Particularly, the intersecting arcs 600 and 602 define a chord 604 extending between the points of intersection 606 and 608 (e.g., $x_1,y_1$ and $x_2,y_2$ on a Cartesian coordinate system representing the xy plane in FIG. 6). Upon identification of the points of intersection 606 and 608, the controller 110 calculates the length 610 of chord 604, for example as represented by Equation (1)

$$l=\sqrt{(x_2-g_1)^2+(y_2-y_1)^2} \qquad (1)$$

As discussed above, the diameter of the marker 160 is known. As such, the length 610 of the chord 604 corresponds to the distance that the marker 160 moved in the visual images 300 and 400 (e.g., as represented by markers 360 and 460). A long chord 610 indicates that the marker 460 moved a relatively short distance during the elapsed time, and a relatively short chord 604 indicates that the marker 460 moved a relatively long distance during the elapsed time. For example, if the length 610 of the chord 604 is equal to the diameter of the marker 160, it indicates to the controller 110 that the marker 460 did not move during the time period between images 300 and 400. If, however, the length 610 of the chord 604 is very close to zero, it indicates to the controller 110 that the marker 460 has moved almost one diameter length from the initial position of marker 360. In one exemplary embodiment, the distance moved may be derived from the chord length 610 based on tables stored in memory 120. In another exemplary embodiment, the distance moved may be derived from the chord length 610 and known characteristics of the marker 160 such as its radius and initial position in the prior sensed image (e.g., marker 360). One exemplary mechanism for determining the distance travelled is provided in Equation (2):

$$\text{dist\_travelled}=\sqrt{D^2-l^2} \qquad (2),$$

where D is the diameter of the marker 160 and l is the length of the chord 604.

As such, the length 610 of the chord 604 determines the extent of movement between the visual images 300 and 400 (FIGS. 3 and 4). The direction of movement corresponds to the direction of a perpendicular vector 612 extending from the chord 604. On exemplary mechanism for expressing the position change vector is provided in Equation (3):

$$positionchangevector = \pm \begin{bmatrix} \frac{-(y_2 - y_1) * dist\_travelled}{l} \\ \frac{(x_2 - x_1) * dist\_travelled}{l} \end{bmatrix} \quad (3)$$

Accordingly, the controller 110 determines the distance and direction of movement of the marker 460 based on the chord 604 of the overlap portion 560 during the time period (dt). Upon consideration of the initial position, the direction of movement, and the distance moved, the controller 110 may also determine the position of the marker 460 at the subsequent time ($t_1$), as well as its rate of motion as a function of the time interval.

In step 250 of method 200, the controller 110 determines the movement and subsequent position of the object 150 during the time period between the images 300 and 400 (FIGS. 3 and 4) based on the distance and direction of movement the marker 160 and the previously known relationship between the marker 160 and the object 150. These relationships include but are not limited to the exact position of the marker on the object 150, orientation of the marker 160 on the object 150, relative position of the marker 160 to other similar or dissimilar markers and other sources of information embedded in marker 160 and separately decoded by the sensor 130 and controller 110 or similar supporting system. In embodiments with such encoding, details embedded in the marker itself may include shape, such as line thickness, characters, or bar codes, or spectral encoding such as color or luminosity in a spectrum not detected by, or filtered out of the image captured by, sensor 130. The position and movement information may be resolved in either a vehicle reference frame or an absolute reference frame. In one exemplary embodiment, the position, velocity, and acceleration calculations based on the position information may be performed by a state estimation module for subsequent use in a navigation solution. For example, the velocity of the object 150 may be determined based on the distance moved over time between two or more images, and acceleration may be determined based on the change in velocity over time between two or more images.

In step 260 of method 200, the controller 110 determines if the observation of the object 150 is complete. If the result of step 260 is yes, the method 200 concludes. However, if the observation of the object 150 is ongoing, the method 200 returns to step 220 and the system 100 captures a subsequent (or third) visual image of the marker 160. Steps 230-260 continue as the third visual image is compared to the second visual image to determine the subsequent movement of the marker 160 and object 150.

Although the system 100 and method 200 are described with respect to the movement of the object 150 in two dimensions (e.g., in the xy-plane), an additional sensor (not shown) may be provided to determine the movement of the object 150 in a third dimension. For example, the additional sensor may be arranged orthogonally relative to the other sensor 130 to determine movement of the object 150 in the xz-plane or the yz-plane such that the three-dimensional movement of the object 150 may be calculated. Similarly, the object 150 is depicted as being flat in the xy-plane. However, other object shapes, such as a rotating shaft may be monitored with a single sensor, or by adding additional sensors and/or additional markers to image a spherical surface or other complex shape.

Accordingly, the system 100 and method 200 enable monitoring of an object without physical contact between an optical sensor and the object. One advantage of such exemplary embodiments includes reduced processing resources as compared to conventional techniques such as those that require pattern recognition on each visual image to determine object or marker position.

Embodiments of the present invention may be described in terms of functional block diagrams and various processing steps. It should be appreciated that such functional blocks may be realized in many different forms of hardware, firmware, and or software components configured to perform the various functions. For example, embodiments of the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for detecting a movement of an object marked with a marker, comprising:
   a sensor configured to capture a first image of the marker and to capture a second image of the marker after the first image, each of the first and second images comprising pixels each having a visual intensity; and
   a controller coupled to the sensor and configured to:
      compare the first image and the second image by comparing the visual intensity of each of the pixels of the first image with the visual intensity of each of the pixels of the second image,
      determine an area of overlap between the first image and the second image based on the comparison,
      calculate a change in position of the marker in the second image relative to the marker in the first image based on the area of overlap, and
      detect the movement of the object based on the change in position of the marker,
   wherein the marker is a circle and the controller is configured to determine the area of overlap as an intersection of a first arc associated with the marker in the first image and a second arc associated with the marker in the second image,
   wherein the controller is configured to compare the first image and the second image by summing values associated with the visual intensity of the pixels of the first image with values associated with the visual intensity of the pixels of the second image to generate composite pixel values.

2. The system of claim 1, wherein the controller is configured to determine the visual intensity of the pixels of the first image and the visual intensity of the pixels of the second image in grayscale.

3. The system of claim 2, wherein the controller is configured to determine the visual intensity as a 1 or a 0.

4. The system of claim 2, further comprising memory coupled to the controller and configured to store the visual intensity of the pixels of the first image with a resolution of 1-bit per pixel.

5. The system of claim 1, wherein the intersection is defined by a first intersection point, a second intersection point, and a chord with a length extending between the first intersection point and the second intersection point, and wherein the controller is configured to determine the change in the position of the marker between the first image and the second image based on the length of the chord.

6. The system of claim 5, wherein the controller is configured to determine a direction of the change in position based on a perpendicular vector extending from the chord.

7. A system for detecting a movement of an object marked with a marker, comprising:
a sensor configured to capture a first image of the marker and to capture a second image of the marker after the first image, each of the first and second images comprising pixels each having a visual intensity; and
a controller coupled to the sensor and configured to:
compare the first image and the second image by comparing the visual intensity of each of the pixels of the first image with the visual intensity of each of the pixels of the second image,
determine an area of overlap between the first image and the second image based on the comparison,
calculate a change in position of the marker in the second image relative to the marker in the first image based on the area of overlap, and
detect the movement of the object based on the change in position of the marker,
wherein the marker is a circle and the controller is configured to determine the area of overlap as an intersection of a first arc associated with the marker in the first image and a second arc associated with the marker in the second image,
wherein the sensor defines a field of view, and wherein the field of view is selected based on an anticipated change of position of the marker in the second image relative to the first image.

8. The system of claim 1, wherein the system is a navigation system of a vehicle, and wherein the controller is configured to calculate a kinematic state of the vehicle based on the movement of the object.

9. The system of claim 1, wherein the controller is configured to determine the area of overlap by identifying relatively large composite pixel values.

10. A method for detecting a movement of an object marked with a marker, the method comprising the steps of:
capturing a first image of the marker;
capturing a second image of the marker, the first and second images comprising pixels, each with a respective visual intensity;
comparing the first image and the second image by comparing the visual intensity of each of the pixels of the first image with the visual intensity of each of the pixels of the second image;
determining an area of overlap between the first image and the second image based on the comparison;
calculating a change in position of the marker in the second image relative to the marker in the first image based on the area of overlap; and
detecting the movement of the object based on the change in position of the marker,
wherein the step of capturing the second image includes selecting a field of view based on an anticipated change of position of the marker in the second image relative to the first image,
wherein the marker is a circle, and wherein the step of determining the area of overlap includes identifying an intersection of a first arc associated with the marker in the first image and a second arc associated with the marker in the second image.

11. The method of claim 10, wherein the steps of capturing the first image and capturing the second image include capturing the first image and the second image in grayscale.

12. The method of claim 10, wherein the intersection is defined by a first intersection point, a second intersection point, and a chord with a length extending between the first intersection point and the second intersection point, and wherein the calculating step includes calculating the change in position based on the length of the chord.

13. The method of claim 12, wherein the calculating step includes calculating a direction of the change in position based on a perpendicular vector extending from the chord.

14. The method of claim 10, wherein the comparing step includes summing values associated with the visual intensity of the pixels of the first image with values associated with the visual intensity of the pixels of the second image to generate composite pixel values.

15. The method of claim 14, wherein the determining step includes identifying relatively large composite pixel values as the area of overlap.

16. The system of claim 1, wherein the controller is configured to calculate the change in position such that,
as the area of overlap increases, an extent of the change in position decreases, and
as the area over overlap decreases, the extent of the change in position increases.

17. The method of claim 10, wherein calculating step includes calculating the change in position such that an extent of the change in position is negatively correlated to the area of overlap.

* * * * *